United States Patent
Saeed

(10) Patent No.: US 6,711,447 B1
(45) Date of Patent: Mar. 23, 2004

(54) MODULATING CPU FREQUENCY AND VOLTAGE IN A MULTI-CORE CPU ARCHITECTURE

(75) Inventor: Ali Saeed, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/349,537

(22) Filed: Jan. 22, 2003

(51) Int. Cl.$^7$ .............................. G05B 9/02; G06F 1/26

(52) U.S. Cl. ..................... 700/82; 713/322; 713/340

(58) Field of Search ................... 713/300, 320, 713/321, 340, 322, 323, 324; 700/82

(56) References Cited

U.S. PATENT DOCUMENTS 6,501,999 B1 * 12/2002 Cai ............................... 700/82
6,631,474 B1 * 10/2003 Cai et al. ..................... 713/300
2003/0088800 A1 * 5/2003 Cai ............................. 713/320

* cited by examiner

Primary Examiner—Leo Picard
Assistant Examiner—Douglas S. Lee
(74) Attorney, Agent, or Firm—Blakely, Sokoloff, Taylor & Zafman LLP

(57) ABSTRACT

A method to save power in a computer system is described. A mechanism is used to control the frequency and voltage of a central processing unit (CPU) of a multi-core CPU architecture environment based on the measured levels of multi-threadedness. By controlling the frequency and voltage of the CPU, the battery life of the computer system may be extended.

25 Claims, 4 Drawing Sheets

| Power Scheme 300 | CPU Core Frequencies 310 |
|---|---|
| Maximum Frequency Mode 301 | Set All CPU Cores to the Maximum Frequency 311 |
| Auto Mode 302 | Modulate CPU Cores Between Predetermined Frequencies 312 |
| Maximum Battery Mode 303 | Set a First Core to a Minimum Frequency and Deactivate All Other Cores 313 |

FIG. 3

MODULATING CPU FREQUENCY AND VOLTAGE IN A MULTI-CORE CPU ARCHITECTURE

FIELD OF THE INVENTION

The present invention pertains to the field of computer architecture design. More particularly, the present invention relates to a method of modulating the frequency and voltage of a central processing unit core based on the level of multi-threadedness.

BACKGROUND OF THE INVENTION

A computer typically executes program codes of an application using a single processing thread. Computers, however, are not limited to single-threaded (ST) workloads. In a multi-threaded (MT) workload, the execution of the program is divided into several related, yet at least partially independent tasks. The tasks are performed in parallel with one another on separate processing cores.

While a MT workload typically provides better performance over a ST workload, the MT workload also consumes more power. In battery powered computer systems such as a laptop or notebook, the higher the power consumption, the faster the remaining battery life is depreciated.

BRIEF DESCRIPTION OF THE DRAWINGS

The embodiments of the present invention are illustrated by way of example and not in the figures of the accompanying drawings, in which like references indicate similar elements and in which:

FIG. 3 is a table of available power modes in a computer system; and

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

A dual processor and a multi-processor system each comprise more than one central processing unit (CPU) core to execute tasks such as desktop applications. Some desktop applications are MT. In such applications, the execution of the work may be divided into several related, yet at least partially independent tasks to be performed in parallel. An application that is MT would probably be better able to utilize the processing capabilities of a dual processor or a multi-processor system than an application that is ST. For example, in a general case where the number of threads is greater than the number of CPU cores, each of the CPU cores is more than likely being utilized. However, an application having a single thread would probably not fully utilize active dual processor or multi-processor systems because the systems would comprise more processing capabilities than is required by the application.

Figure 1:
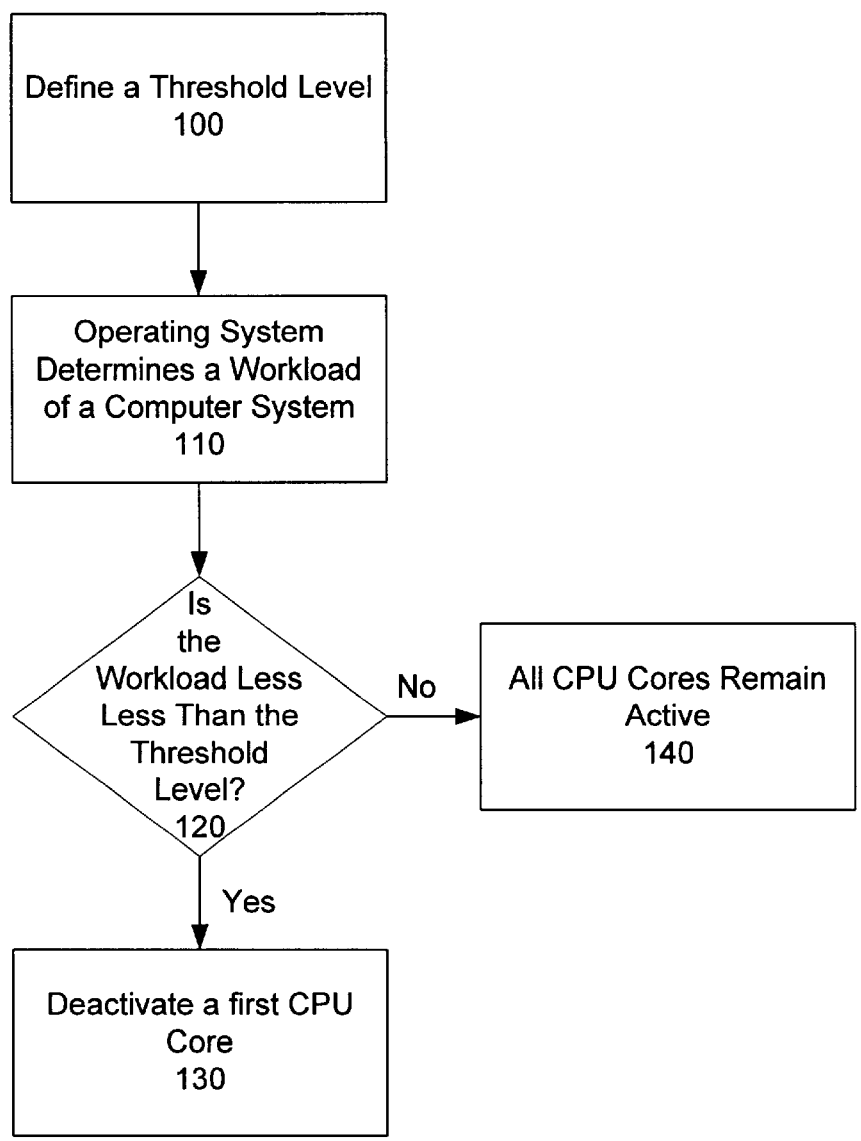
FIG. 1 is an embodiment of a flowchart for saving power in a multi-core CPU architecture.

In computer systems that are mostly powered by battery, power consumption is a concern because the greater the power dissipated, the faster the remaining battery life is reduced. FIG. 1 depicts a flowchart of one embodiment for saving power in a dual processor or a multi-processor platform. A workload threshold level is defined in operation 100. Next, the operating system (OS) of the computer system determines a workload created by the execution of an application in operation 110. For one embodiment of the invention, the workload may be defined by the level of multi-threadedness. The OS may provide an analysis of whether the workload is significantly MT or ST by calculating the percentage in which the workload is MT. The level of multi-threadedness of a system may be tracked using a counter. The counter may monitor each thread. The counter may be incremented for each MT thread (multi-thread) and decremented for each ST thread. For this embodiment, the counter may track a range of 10 threads.

Alternatively, the OS may use a plurality of counters to track the workload. If the OS detects a first application has spawned four threads and a second application is being executed as a single thread, then the workload is 80% MT since four out of the five threads are the result of a MT application. Thus, a system that is running only one application and the application spawns a single thread is 0% MT since multiple threads were not spawned.

Operation 120 then determines if the workload is less than a threshold level. If the workload is not less than the threshold level, then all the CPU cores may remain active in operation 140. Otherwise, if the workload is less than the threshold level, then a first CPU core may be deactivated in operation 130. As an example, if the workload is tracked with a counter having a range of 10 threads, if eight of the 10 threads are determined to be MT and the threshold level is five, all the CPU cores remain active. If the counter value is consistently two or lower, then the first CPU core may be deactivated.

For another embodiment of the invention, in operation 110, the workload may be determined by comparing the number of threads with the number of CPU cores in the system. If the number of threads is greater than the number of CPU cores, then all CPU cores remain active in operation 140. On the other hand, if the number of CPU cores is greater than the number of threads, then a first CPU core is deactivated in operation 130.

For yet another embodiment of the invention, operation 130 comprises reducing a voltage or a frequency of a first CPU core. If the measured workload is less than the threshold level in operation 120, then the voltage or the frequency of the first CPU core is reduced to a predetermined value. Power is defined by the following equation:

$$P = C * V^2 * f,$$

where P is the value of power consumption of a circuit, C is the capacitance of the circuit, V is the voltage supplied to the circuit, and f is the operating frequency of the circuit. Based on the equation, reducing the voltage or the frequency of the circuit will reduce the power consumption of the circuit. Moreover, both the voltage and the frequency of the first CPU core may be reduced at the same time to predetermined values.

For yet another embodiment of the invention, frequency and voltage modulation may be applied to more than one CPU core in operation 130. For example, the frequency and voltage modulation may be applied to all cores. This may be particularly useful for the case where all cores remain active as a result of the level of multi-threadedness being greater than a threshold limit, but the cores are not fully utilized. Having the flexibility to modulate the frequency and voltage of one or more cores allows for the reduction of power consumption. Of course, once the level of multi-threadedness drops below a certain threshold, one of the cores may be deactivated.

Figure 2:
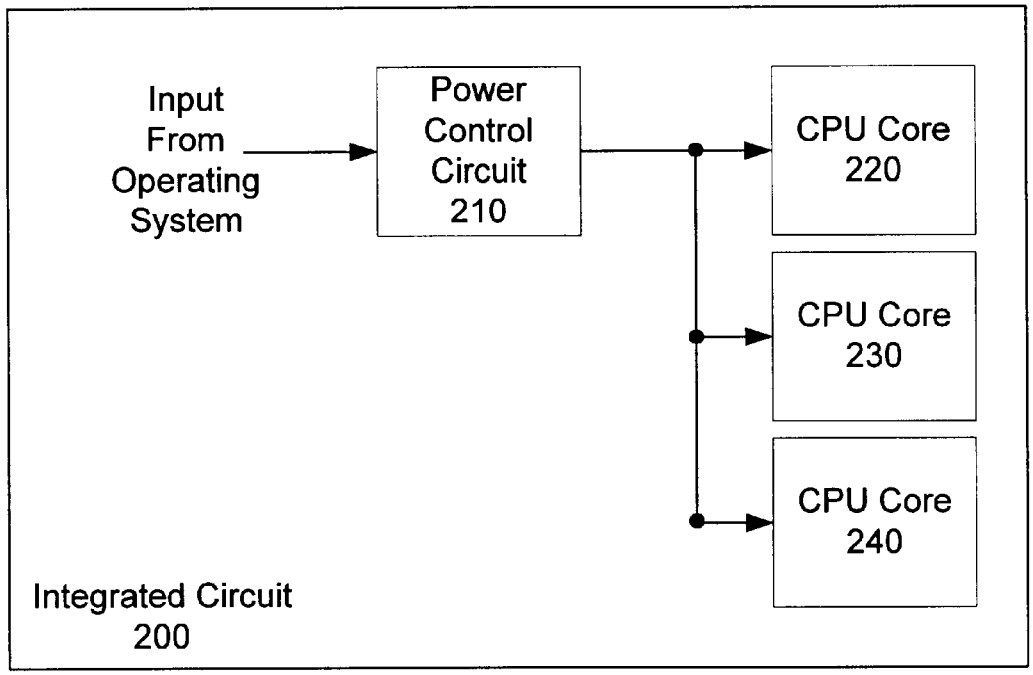
FIG. 2 is an integrated circuit having a mechanism to vary the frequency for multiple CPU cores.

FIG. 2 depicts an integrated circuit (IC) 200 that has a power control circuit for deactivating or lowering a frequency or voltage of a CPU core if a calculated workload is less than a defined threshold. The system of FIG. 2 comprises a power control circuit 210 coupled to a first CPU core 220, a second CPU core 230, and a third CPU core 240. The power control circuit 210 receives as input a measured workload from the operating system. The workload may be defined by the level of multi-threadedness of the IC 200. If the level of multi-threadedness is less than a defined value, the first CPU core 220 may be deactivated or a voltage and a frequency of the first CPU core 220 may be reduced to predetermined values. The predetermined voltage and frequency values may be stored in microcode or basic input/output system.

FIG. 3 depicts a table of a computer system having alternative user defined power schemes. The computer system may have a maximum frequency mode 301, an auto mode 302, and a maximum battery mode 303. If the system is placed in the maximum frequency mode 301, all CPU cores of the computer system are set to the maximum operating frequency 311. Even if the system has a workload with a low level of multi-threadedness, all CPU cores remain active to optimize performance.

If the computer system, however, is placed in auto mode 302, the CPU cores are modulated between predetermined frequencies 312. For example, an OS of a computer system may have a first threshold level and a second threshold level. The second threshold level may be less than the first threshold level. If the OS determines that a workload has a level of multi-threadedness lower than the first threshold level, the CPU cores may be lowered to a first frequency. If the OS of the computer system further determines that the workload has a level of multi-threadedness lower than the second threshold level, the CPU cores may be lowered to a second frequency. The second frequency may be lower than the first frequency. This implementation, however, is not limited to only two frequencies. The system may have multiple operating frequency points which may be selected based on a pre-defined table of multi-threadedness in a given workload.

Finally, if the computer system is in the maximum battery mode 303, a first CPU core may be set to a minimum frequency, while all other cores are deactivated 313. In such a case, CPU cores are deactivated, even if the cores were being fully utilized, in the interest of conserving power to maximize the life of the battery. For another embodiment of the invention, instead of deactivating some of the CPU cores, all of the cores may be set to a minimum frequency to soften the performance impact to the system if the system workload is substantially MT and the power scheme is set to the maximum battery mode 303.

Figure 4:
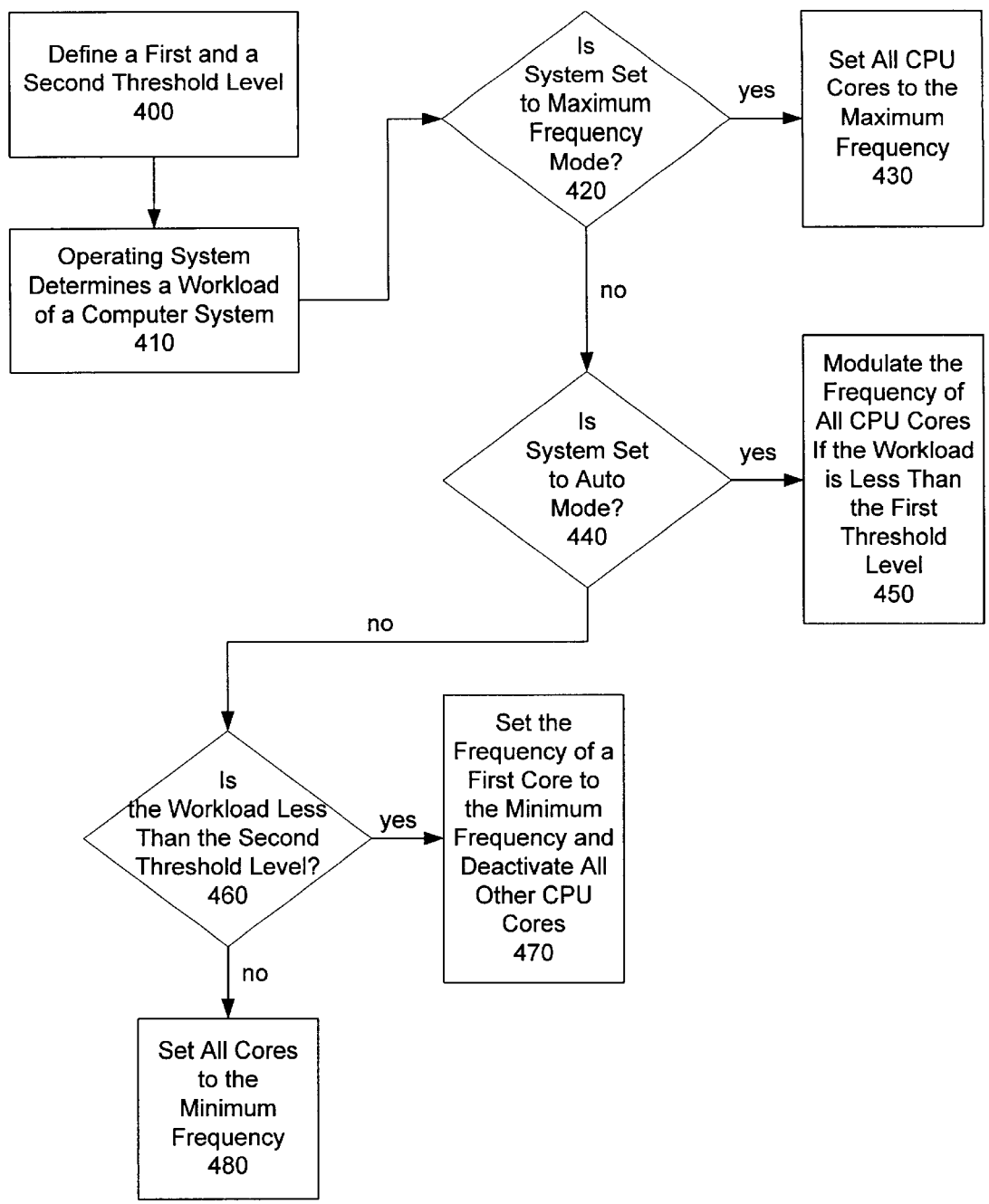
FIG. 4 is an embodiment of a flowchart for a computer system having alternative power modes.

FIG. 4 depicts an embodiment of a flowchart of a computer system having alternative user defined power schemes. The user defines a first workload threshold level and a second workload threshold level in operation 400. The second threshold level is less than the first threshold level. The OS determines a workload of the computer system in operation 410. If the system is set to the maximum frequency mode in operation 420, then all CPU cores are set to the maximum operating frequency in operation 430. If the system is not set to the maximum frequency mode in operation 420, the next operation 440 involves determining if the system is set in auto mode 440.

If the system is set to the auto mode, the frequency of all CPU cores may be modulated between the predetermined minimum frequency and the predetermined maximum frequency 450. The frequency setting may be a function of the level of multi-threadedness measured in operation 410. Depending on the level of multi-threadedness of the system, a lookup table or a logic circuit may be used to determine a corresponding frequency that is between the minimum frequency and the maximum frequency. Similarly, voltages of the CPU cores may be adjusted based on the level of multi-threadedness measured.

If the system is set to the maximum battery mode. Operation 460 determines if the workload is less than the second threshold level. If the workload is less than the second threshold level, the frequency of the first core may be set to the minimum frequency and all other CPU cores are deactivated in operation 470. If the workload is greater than the second threshold level, the frequency of all cores may be set to the minimum frequency 480.

For another embodiment of the invention, the modes of operation are determined by the level of multi-threadedness. For example, the system may be placed in the maximum frequency mode if the workload is determined to be greater than the first defined threshold level. Similarly, the system may be placed in the maximum battery mode if the workload is determined to be less than the second defined threshold level. If the workload otherwise falls between the first defined threshold level and the second defined threshold level, the system is placed in the auto mode. In the auto mode, the frequency and the voltage of the CPU cores may modulate between a range of values. The frequency and the voltage of each CPU core may be a function of the measured workload.

Embodiments of the present invention may be implemented in hardware or software, or a combination of both. However, preferably, embodiments of the invention may be implemented in computer programs executing on programmable computer systems each comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion.

Each program may be implemented in a high level procedural or object oriented programming language to communicate with the computer system. However, the programs may be implemented in assembly or machine language, if desired. In any case, the language may be a compiled or interpreted language.

Each such computer program may be stored on a storage media or device (e.g., hard disk drive, floppy disk drive, read only memory (ROM), CD-ROM device, flash memory device, digital versatile disk (DVD), or other storage device) readable by a general or special purpose programmable computer system, for configuring and operating the computer system when the storage media or device is read by the computer system to perform the procedures described herein. Embodiments of the invention may also be considered to be implemented as a machine-readable storage medium, configured for use with a computer system, where the storage medium so configured causes the computer system to operate in a specific and predefined manner to perform the functions described herein.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A computer system, comprising:
   a first central processing unit (CPU) core;
   a second CPU core coupled to the first CPU core; and
   a circuit coupled to the first and the second CPU cores, wherein the circuit deactivates the first CPU core if a measured workload of the cores is less than a first defined level of multi-threadedness.

2. The computer system of claim 1, wherein the first CPU core, the second CPU core, and the circuit are powered by a battery.

3. The computer system of claim 2, wherein the workload is approximately equal to a number of multiple threads spawned divided by a number of total threads.

4. The computer system of claim 1, wherein the first CPU core has a voltage and an operating frequency, wherein the operating frequency of the first CPU core is decreased if the workload is less than a second defined level of multi-threadedness.

5. The computer system of claim 1, wherein the workload is determined by an operating system.

6. An apparatus, comprising:
   means for determining workload as a function of a number of multi-threads in a central processing unit (CPU) architecture having a plurality of CPU cores; and
   means for reducing an operating frequency of a first CPU core if the level of multi-threads is less than a defined threshold.

7. The apparatus of claim 6, further comprising:
   means for reducing a voltage of the first CPU core if the level of multi-threads is less than the defined threshold.

8. The apparatus of claim 6, further comprising:
   means for deactivating the first CPU core if the level of multi-threads is less than the defined threshold.

9. The apparatus of claim 6, further comprising:
   means for setting the plurality of CPU cores at a lowest needed frequency.

10. A method, comprising:
    setting an upper threshold limit;
    setting a lower threshold limit;
    measuring a workload of a computer based on a number of multi-threaded threads running on the computer; and
    decreasing an operating frequency of a first central processing unit (CPU) core if the measured workload is less than the lower threshold limit.

11. The method of claim 10, further comprising:
    deactivating the first CPU core; and
    keeping a second CPU core active.

12. The method of claim 11, further comprising:
    keeping the first CPU core and the second CPU core active if the measured workload is greater than the upper threshold limit.

13. A method, comprising:
    defining a threshold level;
    determining a workload of a computer system having at least two central processing unit (CPU) cores, wherein the workload is computed by an operating system; and
    deactivating a first CPU core if the workload is less than the threshold level.

14. The method of claim 13, wherein the computer system is a battery powered laptop computer system.

15. The method of claim 13, wherein the operating system tracks the workload using a counter, wherein the counter is incremented if a multi-threaded thread is detected, wherein the counter is decremented if a single-threaded thread is detected.

16. An article comprising a machine readable medium having a plurality of machine readable instructions, wherein when the instructions are executed by a processor, the instructions cause a system to:
    determine a workload of the system;
    send instructions to a plurality of central processing unit (CPU) cores; and
    turn off at least one of the plurality of CPU cores if the workload is less than a threshold value.

17. The article of claim 16, further comprising:
    reduce a frequency of at least one of the plurality of CPU cores if the workload is less than the threshold value.

18. The article of claim 16, further comprising:
    reduce a voltage of at least one of the plurality of CPU cores if the workload is less than the threshold value.

19. The article of claim 16, further comprising:
    operate the plurality of CPU cores at a maximum frequency if the system is set to a maximum frequency mode.

20. A system, comprising:
    a first processor core having a first operating frequency;
    a second processor core having a second operating frequency; and
    a circuit coupled to the first and the second processor cores, wherein the circuit decreases the first operating frequency if a measured workload of the system is greater than a defined threshold, wherein the workload is based on the number of multi-threads running on the system.

21. The system of claim 20, wherein the circuit sets the first and the second processor cores to a minimum frequency if the system is placed in a maximum battery mode.

22. The, system of claim 20, wherein the circuit modulates the CPU cores between predetermined frequencies if the system is placed in an auto mode, wherein the set frequencies are a function of the measured workload.

23. The system of claim 22, wherein the predetermined frequencies are stored in basic input/output system.

24. The system of claim 22, wherein the predetermined frequencies are stored in microcode.

25. The system of claim 20, wherein the circuit decreases a voltage of the first circuit if the workload of the system is greater than a defined threshold.

* * * * *